United States Patent
Xu et al.

(10) Patent No.: US 10,558,762 B2
(45) Date of Patent: Feb. 11, 2020

(54) SYSTEM AND METHOD FOR ADAPTIVE QUALITY ESTIMATION FOR MACHINE TRANSLATION POST-EDITING

(71) Applicant: International Business Machines Corporation, Armonk, NY (US)

(72) Inventors: Jian-ming Xu, Yorktown Heights, NY (US); Fei Huang, Morris, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 75 days.

(21) Appl. No.: 15/904,350

(22) Filed: Feb. 24, 2018

(65) Prior Publication Data

US 2019/0266249 A1    Aug. 29, 2019

(51) Int. Cl.
*G06F 17/28* (2006.01)

(52) U.S. Cl.
CPC ........ *G06F 17/2854* (2013.01); *G06F 17/289* (2013.01); *G06F 17/2863* (2013.01)

(58) Field of Classification Search
USPC ..... 704/1–504; 358/403; 716/103, 104, 105; 717/136–161
See application file for complete search history.

(56) References Cited

U.S. PATENT DOCUMENTS

| | | | |
|---|---|---|---|
| 6,285,978 B1 | 9/2001 | Bernth et al. | |
| 7,209,875 B2 | 4/2007 | Quirk et al. | |
| 7,752,034 B2 | 7/2010 | Brockett et al. | |
| 8,145,472 B2 | 3/2012 | Shore et al. | |
| 8,572,109 B1 | 10/2013 | Hodge et al. | |
| 8,731,901 B2* | 5/2014 | Srihari | G06F 17/2863 704/2 |

(Continued)

OTHER PUBLICATIONS

Soricut et al.,. "The SDL language weaver systems in the WMT12 quality estimation shared task." Proceedings of the Seventh Workshop on Statistical Machine Translation. Association for Computational Linguistics, 2012.

(Continued)

*Primary Examiner* — Marcus T Riley
(74) *Attorney, Agent, or Firm* — Garg Law Firm, PLLC; Rakesh Garg; Anthony Curro

(57) ABSTRACT

A translation text output corresponding to a machine translation from a source text of a first language to a target text of a second language is received. The translation text output includes at least one sentence including at least one translation chunk. A first translation quality confidence estimate for the at least one sentence of the text and a second translation quality confidence estimate for the at least one translation chunk are received. A first translation confidence indicator for the at least one sentence and a second translation confidence indicator for the at least one translation chunk are displayed. The first translation confidence indicator is determined from among a plurality of different first translation confidence indicators based upon the first translation quality confidence estimate. The second translation confidence indicator is determined from among a plurality of different second translation confidence indicators based upon the second translation quality confidence estimate.

20 Claims, 8 Drawing Sheets

(56) References Cited

U.S. PATENT DOCUMENTS

| | | | | |
|---|---|---|---|---|
| 8,798,984 B2* | 8/2014 | Cancedda | ........... | G06F 17/2818 |
| | | | | 704/2 |
| 8,886,517 B2* | 11/2014 | Soricut | ............... | G06F 17/2854 |
| | | | | 704/2 |
| 8,990,064 B2* | 3/2015 | Marcu | ................... | G06F 17/289 |
| | | | | 704/10 |
| 2008/0154577 A1* | 6/2008 | Kim | .................... | G06F 17/2775 |
| | | | | 704/2 |
| 2012/0278060 A1* | 11/2012 | Cancedda | ........... | G06F 17/2818 |
| | | | | 704/2 |
| 2013/0103381 A1 | 4/2013 | Assche | | |
| 2015/0127373 A1* | 5/2015 | Li | ....................... | G06F 17/2827 |
| | | | | 705/2 |

OTHER PUBLICATIONS

Soricut et al., "Combining quality prediction and system selection for improved automatic translation output." In Proceedings of the Seventh Workshop on Statistical Machine Translation, Montreal, Canada,. Association for Computational Linguistics, Jun. 2012.

Specia et al., "Improving the Confidence of Machine Translation Quality Estimates," In: Machine Translation Summit XII, Aug. 26-30, 2009, Ottawa, Canada.

Barrachina et al. "Statistical approaches to computer-assisted translation." Computational Linguistics 35.1 (2009): 3-28.

* cited by examiner ly to a method, system, and computer program product for providing adaptive quality estimation for machine translation during post-editing of a translated document.

SYSTEM AND METHOD FOR ADAPTIVE QUALITY ESTIMATION FOR MACHINE TRANSLATION POST-EDITING

TECHNICAL FIELD

The present invention relates generally to a method, system, and computer program product for providing quality estimation for machine translation (MT). More particularly, the present invention relates to a method, system, and computer program product for providing adaptive quality estimation for machine translation during post-editing of a translated document.

BACKGROUND

Machine translation (MT) is a category of computational linguistics in which a computer is used to translate text or speech from one language to another such as from English to Chinese. The process of machine translation does not typically include providing only a one-to-one word translation of a source language to a target language. Machine translation often involves using knowledge of rules of grammar, syntax, and semantic meaning of the source language to translate the source language to the target language to convey the same meaning within the target language as was conveyed in the source language. Statistical machine translation uses statistical models whose parameters are derived from the analysis of bilingual textual corpora to perform translation from a source language text to a target language text. Rule-based machine translation uses linguistic information about the source language and target language retrieved retrieve from dictionaries and grammars to translate text from the source language to the text language.

SUMMARY

The illustrative embodiments provide a method, system, and computer program product. An embodiment of a method includes receiving a translation text output, the translation text output corresponding to a machine translation from a source text of a first language to a target text of a second language. In the embodiment, the translation text output includes at least one sentence, the at least one sentence including at least one translation chunk. The embodiment further includes receiving a first translation quality confidence estimate for the at least one sentence of the text, and receiving a second translation quality confidence estimate for the at least one translation chunk. The embodiment further includes displaying a first translation confidence indicator for the at least one sentence. In the embodiment, the first translation confidence indicator is determined from among a plurality of different first translation confidence indicators based upon the first translation quality confidence estimate. The embodiment further includes displaying a second translation confidence indicator for the at least one translation chunk. In the embodiment, the second translation confidence indicator is determined from among a plurality of different second translation confidence indicators based upon the second translation quality confidence estimate.

An embodiment further includes displaying a context information of the translation chunk indicating a context of the translation chunk within the source text. In an embodiment, the context information includes a location within the source text where the translation chunk is found. In an embodiment, the context information further includes one or more other translation chunks within the source text adjacent to the translation chunk.

In an embodiment, the context information further includes an indication of a location within a target language training corpus that was used to derive the translation chunk. In an embodiment, the displaying of the context information of the translation chunk is responsive to a first user input. In an embodiment, the first user input includes placing a mouse cursor upon the translation chunk.

An embodiment further includes displaying an alignment between corresponding translation chunks in the source text and the translation text output. In an embodiment, the displaying of the alignment is responsive to a second user input. In an embodiment, the second user input includes clicking a mouse pointer upon the translation chunk.

An embodiment further includes receiving a user input indicating a moving of the translation chunk in the translation text output. In an embodiment, the translation chunk includes a phrase. In an embodiment, each of the plurality of different second translation confidence indicators includes a different color. In an embodiment, each of the plurality of different second translation confidence indicators includes a different font.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
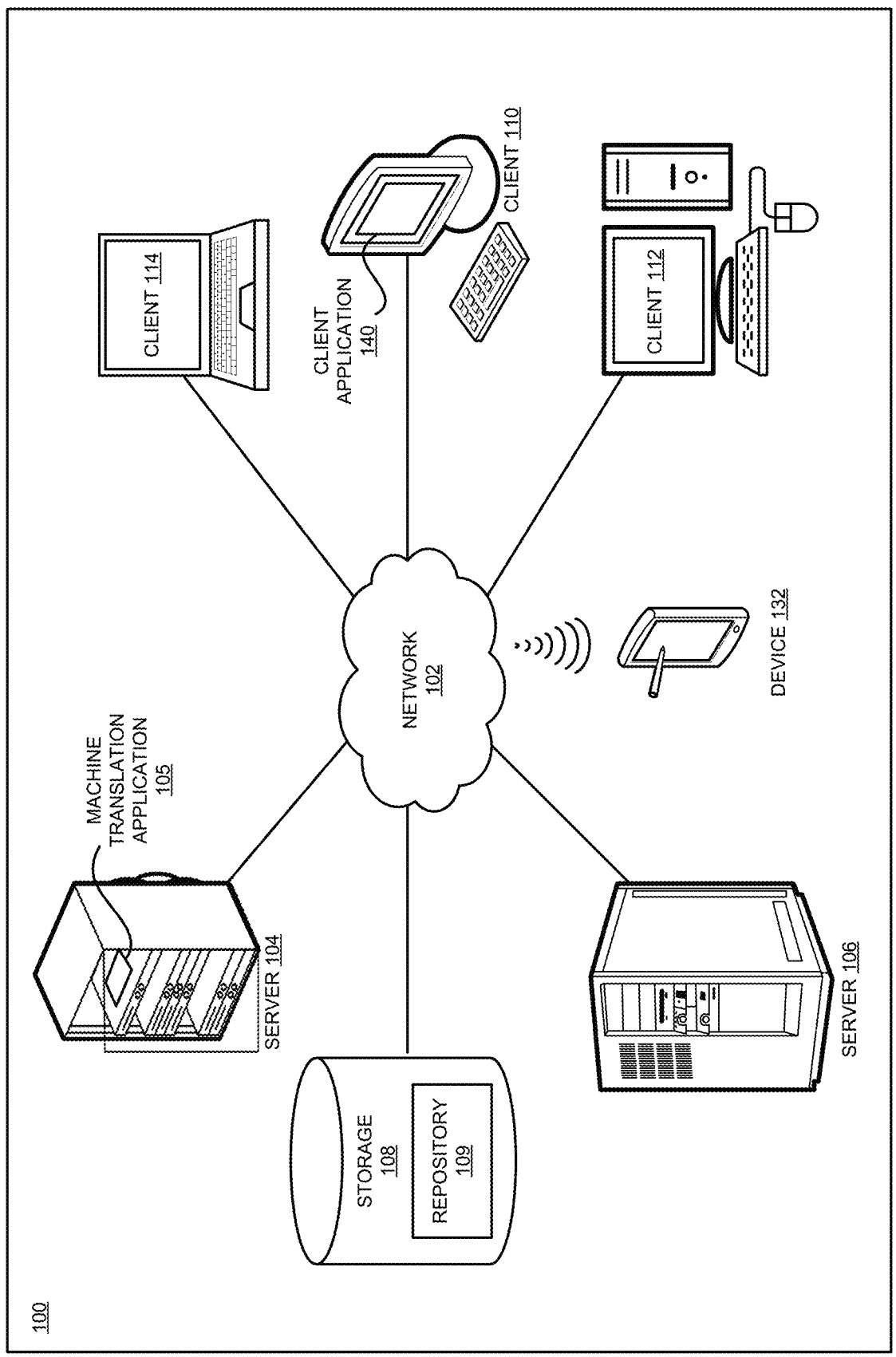
FIG. 1 depicts a block diagram of a network of data processing systems in which illustrative embodiments may be implemented.

One or more embodiments are directed to a method, system, and computer program product for providing adaptive quality estimation for machine translation during post-editing of translated documents. Machine translation (MT) systems often suffer from inconsistent and unpredictable translation quality. Given an MT system, depending on the difficulty of the input sentences (words, sentence structures or the level of match with the MT system's training data), some translation outputs can be perfect and error-free, while others are ungrammatical, missing important words or even totally garbled. As a result, users do not know whether and when they can trust the translation output. This shortcoming significantly hurdles the adoption of MT systems, especially in machine assisted translation post-editing. Human translators often translate the foreign sentences from scratch instead of editing existing MT outputs, even if some outputs are very accurate and post editing those outputs could potentially lead to significant cost savings.

As a result, it would be beneficial to provide a confidence estimation of MT output quality to the users, who can decide whether to accept the MT outputs or make minor modifications for "good" translations or skip the MT output altogether and translate from scratch for "bad" translations. As a result, significant time-savings can be achieved by avoiding the reading and parsing low quality MT output, thus improving the user experience. Existing approaches of MT quality estimation rely on lexical and syntactical features defined over parallel sentence pairs (including source sentences, MT outputs and reference translations) and translation models. In existing MT quality estimation approaches, when the MT confidence estimation model is trained, the model is fixed and will not adapt to different input documents or translation models. However, translation models adapted to different input documents can significantly improve the translation quality.

The illustrative embodiments recognize that the presently available tools or solutions do not address these needs or provide adequate solutions for these needs. The illustrative embodiments used to describe the invention generally address and solve the above-described problems and other problems related to providing quality estimation for machine translation outputs.

An embodiment can be implemented as a software application. The application implementing an embodiment can be configured as a modification of an existing MT system, as a separate application that operates in conjunction with an existing MT system, a standalone application, or some combination thereof.

One or more embodiments describe an adaptive quality estimation process for machine translation post-editing tasks in which a document-specific machine translation (MT) system is built for each input document. In the embodiment, the MT system extracts sentence pairs most similar to the input document from a corpus, and trains an adaptive quality estimation model using the extracted sentence pairs. In the embodiment, the MT system predicts a translation error rate (TER) using the adaptive quality estimation model and provides a user interface to display the quality estimation results to a user in conjunction with the translation output.

In an embodiment, a graphical user interface (GUI) displays translation chunks, such as words or phrases, in a translation output window with different quality confidence indicators using different fonts and/or colors. In an embodiment, the GUI displays both source and target context information for phrase translation pairs. In an embodiment, the GUI displays an alignment between translation phrase pairs and allows movement and editing of translation chunks to improve translation accuracy as well as the translator's efficiency.

In another embodiment, the GUI presents a user with translation quality indicators, and allows the user to decide whether to accept or modify the MT translation output, re-use part of the translation, or reject the translation and translate a portion of the translation output using human translation.

In an embodiment, a user interface is provided to display both sentence level translation quality estimation and phrase level translation confidence. In an embodiment, on a sentence level the predicted translation error rate (PIER) of a sentence is represented in the GUI by a multi scale translation confidence indicator. In the embodiment, on a phrase level, the confidence of the translation of the phrase is represented with different fonts and/or colors.

In a particular embodiment, when a mouse cursor is placed on a phrase of the translated text, context information of the phrase, such as the where the phrase is extracted, is displayed in a popup window within the GUI. In the embodiment, when the mouse cursor is clicked on the translation, phrase level alignment between the source sentence and MT output is displayed in a popup window of the GUI, which allows the user to observe the relationship of the source and target phrases. In a particular embodiment, the GUI allows the user to move a whole phrase to address word order translation errors if necessary.

Various embodiments described herein build a document specific MT system for each document to be translated enabling the model to be a better match to a source document than static MT systems. In various embodiment, a quality estimation model is also adaptively trained that may outperform static quality estimation models. In various embodiments, quality estimation is not only conducted on the whole sentence level, but also on subsentential level, in which high confident words/phrases are highlighted. In various embodiments, overall sentence translation quality and confident regions are presented to the user in order to improve a translator's productivity and user experience.

The illustrative embodiments are described with respect to certain types of documents, corpora, transmissions, translations, procedures, algorithms, GUIs, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
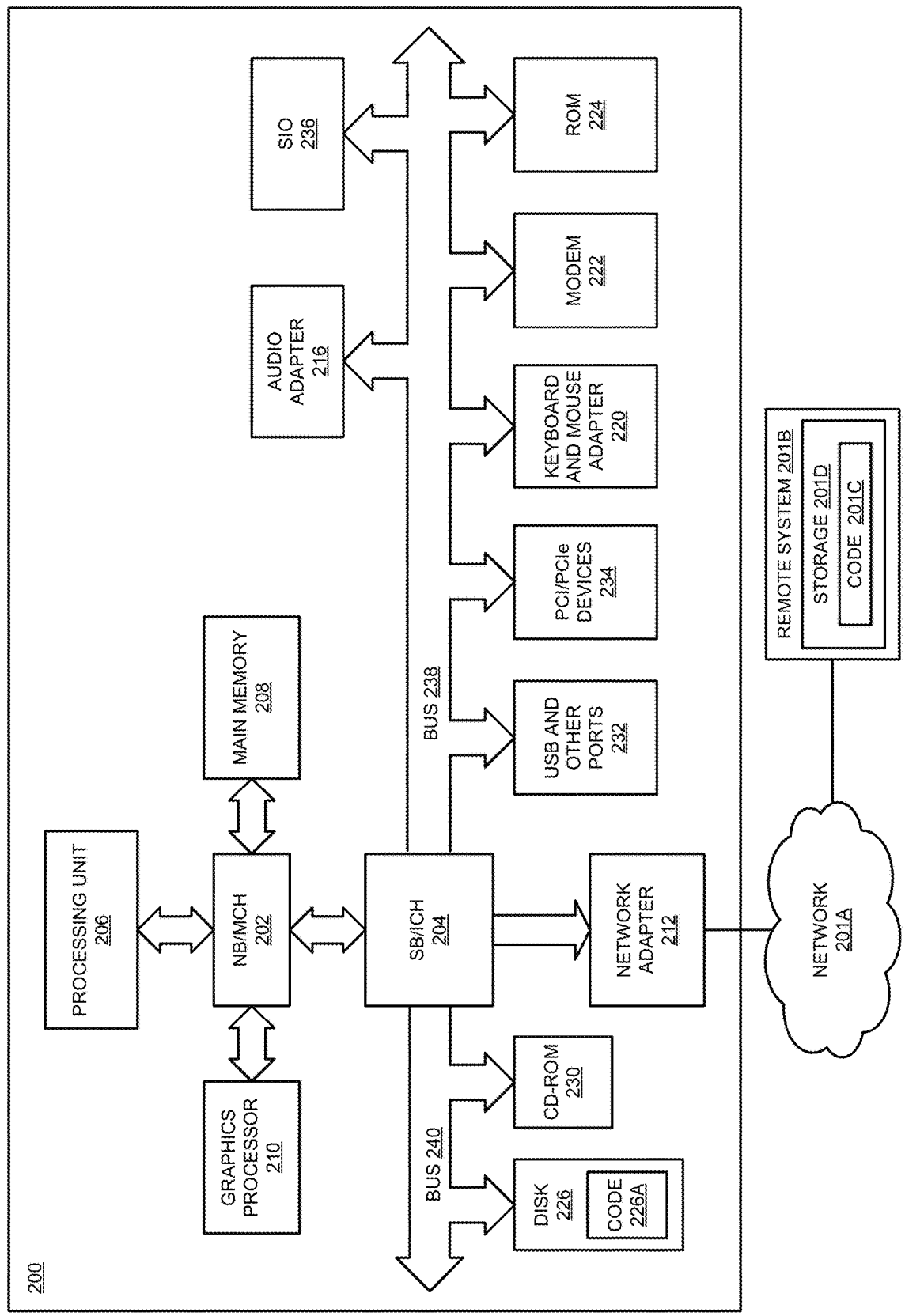
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Machine translation (MT) application 105 implements an embodiment described herein. In other embodiments, MT application 105 may be configured to perform the machine translation and quality estimation processes described herein. Repository 109 may be stored in storage 108 as shown or supplied by another source (not shown) and may include training documents, training corpus, and other documents and training data as described herein. Client 110 includes a client application 140 configured to provide a user interface as further described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
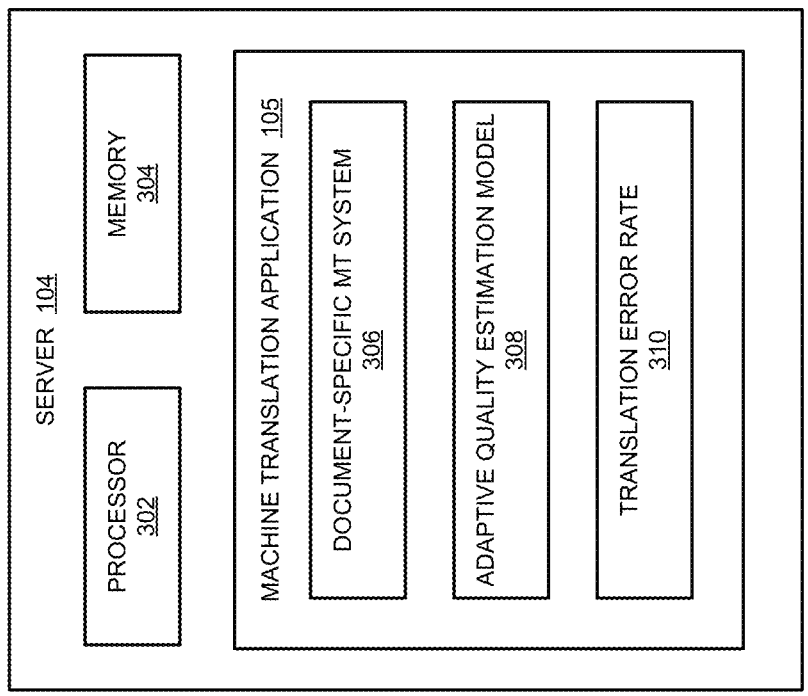
FIG. 3 depicts a block diagram of an example configuration of a server for providing adaptive quality estimation for machine translation during post-editing of a translated document in accordance with an illustrative embodiment.

With reference to FIG. 3, this figure depicts a block diagram of an example configuration of a server for providing adaptive quality estimation for machine translation during post-editing of a translated document in accordance with an illustrative embodiment. Server 104 is an example of message source server 104 of FIG. 1 and includes a processor 302, a memory 304, and a machine translation (MT) application 105. Processor 302 is configured to retrieve instructions from memory 304 and execute the instructions to perform various operations of server 104 as described herein.

Server application 105 a document-specific MT system component 306, an adaptive quality estimation model component 308, and a translation error rate component 310. Server application 105 is configured to perform operations associated with providing adaptive quality estimation for machine translation during post-editing of a translated document as described herein. Document-specific MT system component 306 is configured to build a document-specific MT system for each input document as further described herein. Adaptive quality estimation model component 308 is configured to store a trained adaptive quality estimation model as further described herein. Translation error rate component 310 is configured to predict a translation error rate (TER) of translation chunks using the adaptive quality estimation model.

Figure 4:
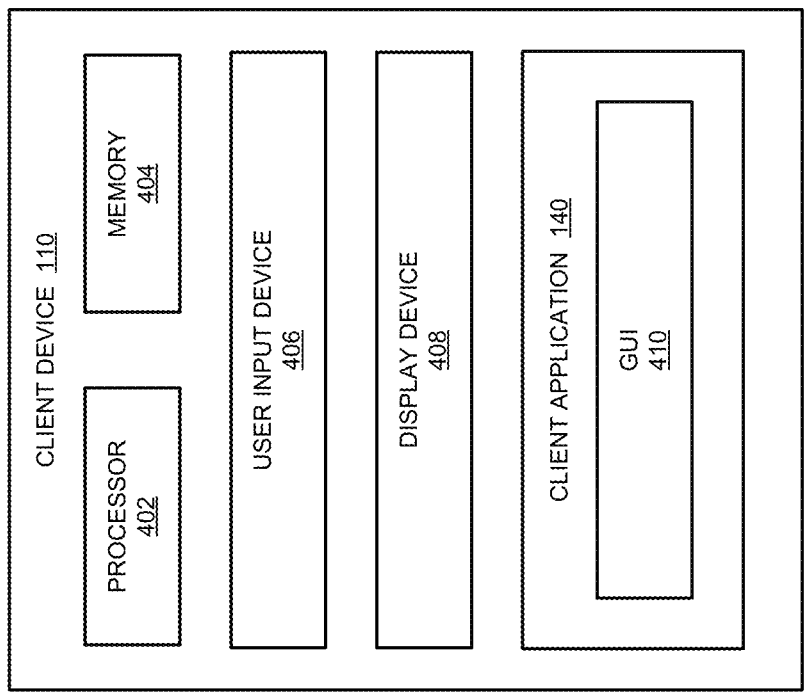
FIG. 4 depicts a block diagram of an example configuration of a client device for receiving adaptive quality estimation for machine translation during post-editing of a translated document in accordance with an illustrative embodiment.

With reference to FIG. 4, this figure depicts a block diagram of an example configuration of a client device for receiving adaptive quality estimation for machine translation during post-editing of a translated document in accordance with an illustrative embodiment. Client device 110 is an example of client device 110 of FIG. 1 and includes a processor 402, a memory 404, a user input device 406, a display device 408, and a client application 140. Processor 402 is configured to retrieve instructions from memory 404 and execute the instructions to perform various operations of client device 110 as described herein. In one or more embodiments, user input device 406 is configured to provide one or more input devices to allow the user to interact with client device 110. In one or more embodiments, display device 408 is configured to display machine translation output to a user of client device 110. Client application 140 includes a graphical user interface (GUI) component 410 to provide a user interface as described herein.

Figure 5:
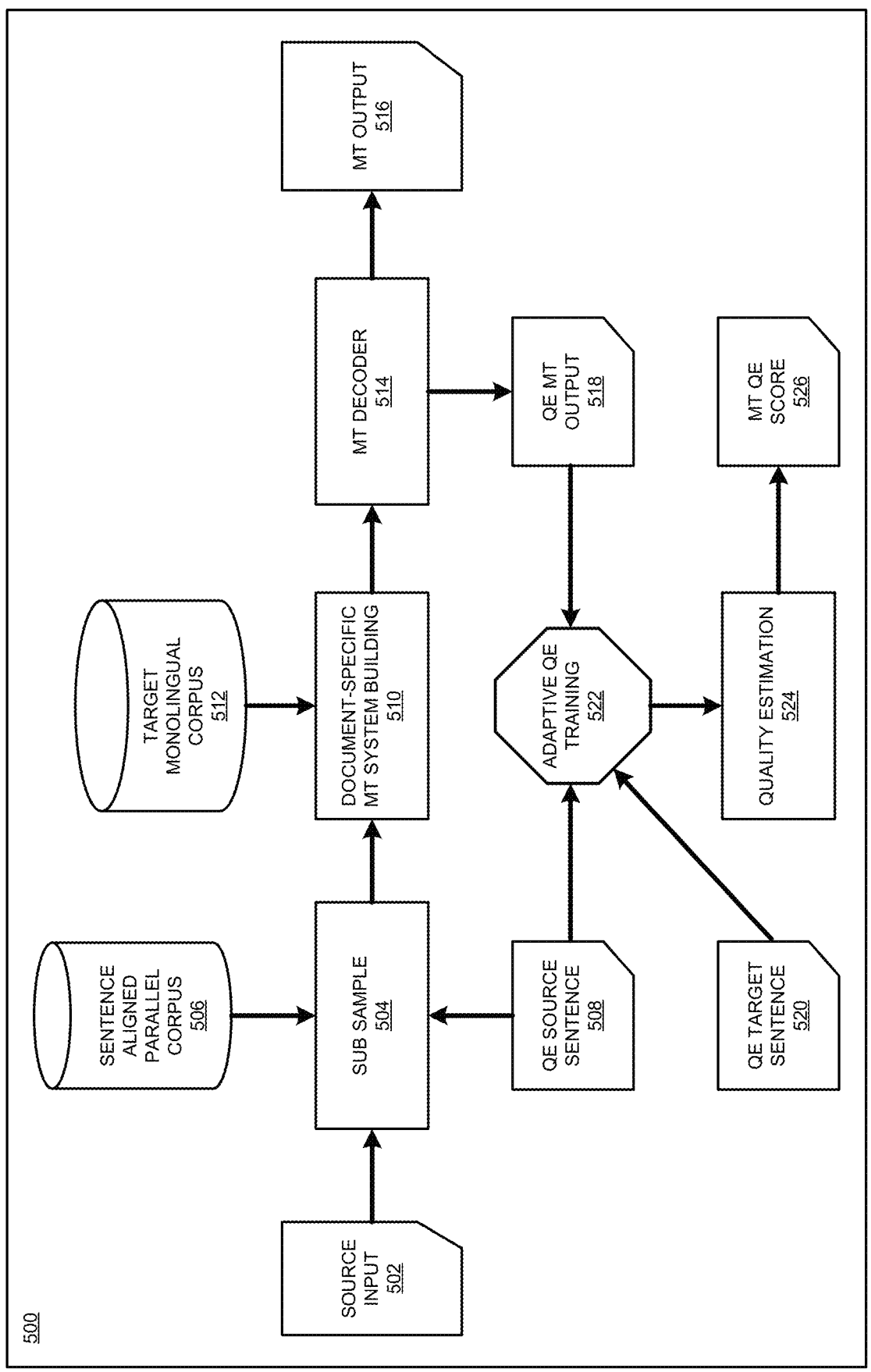
FIG. 5 depicts an embodiment of training, decoding, and quality estimation prediction processes of the machine translation (MT) application of FIG. 1.

With reference to FIG. 5, this figure depicts an embodiment of training, decoding, and quality estimation prediction processes of the machine translation (MT) application 105 of FIG. 1. In the embodiment, a source input document 502 that includes text of a source language that is desired to translated to a target language is provide to a subsample process 504. A sentence aligned parallel corpus 506 and a quality estimation (QE) source sentence 508 are also provide to subsample process 504. Subsample process 504 uses source input document 502 and sentence aligned parallel corpus 506 to subsample source input document 502 and provides the subsampled input document information to a document-specific MT system building process 510. Document-specific MT system building process 510 uses the subsampled parallel corpus and a target monolingual corpus 512 to build a document-specific MT system.

An MT decoder process 514 decodes the source input document 502 using the document-specific MT system to produce a MT output 516. MT decoder process 514 further decodes the QE source sentence to produce a QE MT output 518. An adaptive quality estimation training process 522 receives QE source sentence 508 and QE MT output 518. Adaptive QE training process 522 uses QE source sentence 508, QE MT output 518, and a QE target sentence 520 to train an adaptive QE model. The adaptive QE model produces a quality estimation of MT output 516 and provides a machine translation QE score 526.

Figure 6:
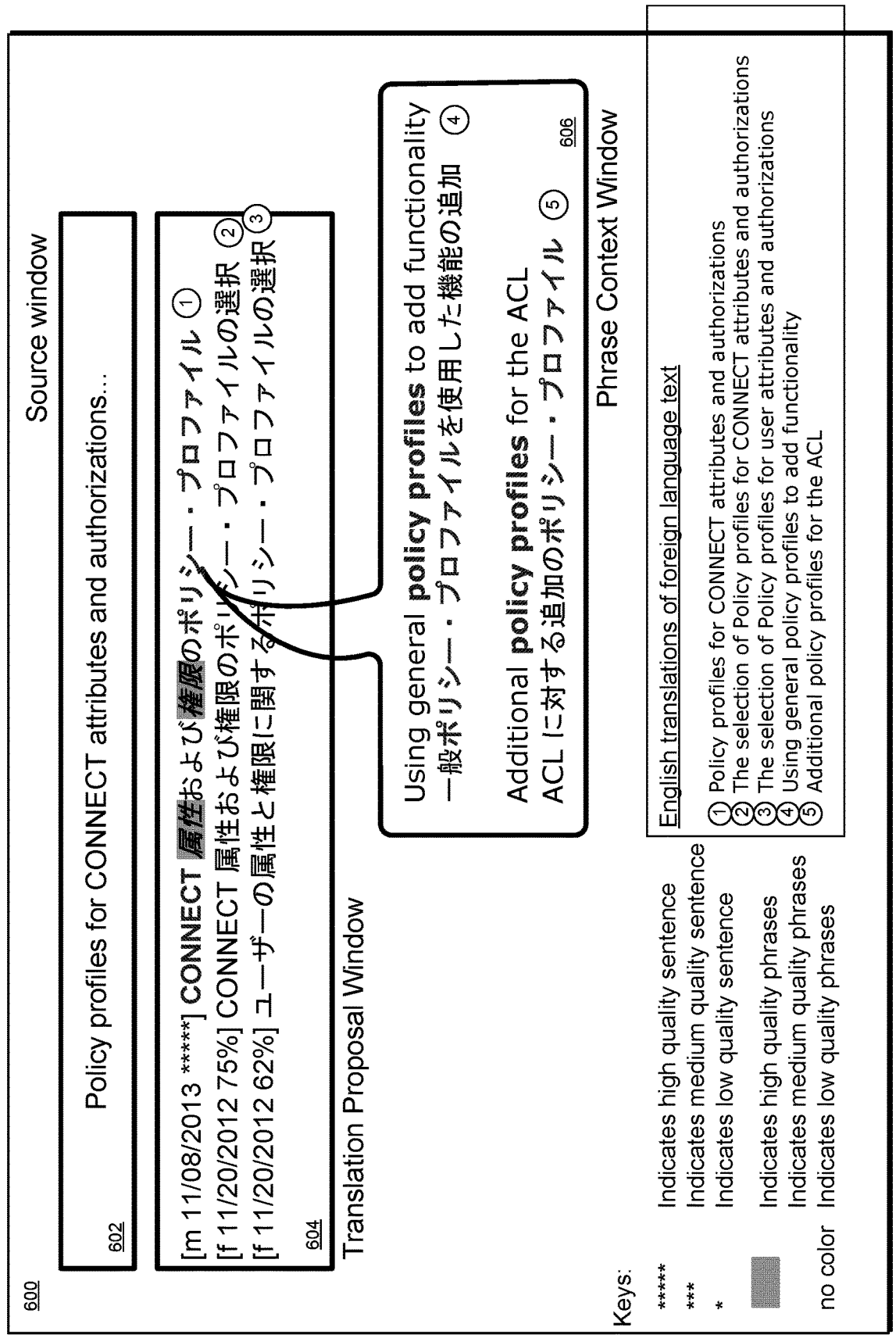
FIG. 6 depicts an example of a graphical user interface (GUI) in accordance with an illustrative embodiment.

With reference to FIG. 6, this figure depicts an example of a graphical user interface (GUI) 600 in accordance with an illustrative embodiment. GUI 600 includes a source window 602, a translation proposal window 604, and a phrase context window 606. Source window 602 includes a source text in a first language that is desired to be translated into a second language. In the example illustrated in FIG. 6, a source text in the English language is desired to be translated to the Japanese language. Translation proposal window 604 includes a sentence level translation quality estimation in which predicted translation error rate (PTER) is represented by a multi-scale translation confidence indicator in which high quality translated sentence is indicated by five stars "***", a medium quality translated sentence is indicated by three stars "*", and a low quality translated sentence is represented by one star "*". Although the particular embodiment illustrated in FIG. 6 is shown as using stars to indicate the translation quality of a particular sentence, in other embodiments other suitable visual indicators may be used to represent a multi-scale translation confidence indicator.

Translation proposal window 604 further includes a translation confidence indicator of one or more phrases of the translation output within the translation proposal windows 604. In one or more embodiments, a highlight color is used as a translation confidence indicator of the phrases of the translation output. In the embodiment of FIG. 6, a first color is used as a translation confidence indicator to indicate a high quality phrase, a second color is used as a translation confidence indicator to indicate a medium quality phrase, and no color is used to indicate a low quality phrase.

In the embodiment of FIG. 6, when a user uses GUI 600 to place a mouse cursor on a particular phrase within translation proposal window 604, GUI 600 displays phrase context window 606 in a pop-up window. Phrase context window 606 displays context information of the phrase indicating a context of the phrase within the source text. In one or more embodiments, phrase context window 606 includes an indication of a location within the source text where the phrase is found as well as one or more words or phrases adjacent to, such as occurring before and/or after, the phrase within the source text. In one or more embodiments, the context window also includes an indication of a location within a target language training corpus that was used to derive the translated phrase.

Figure 7:
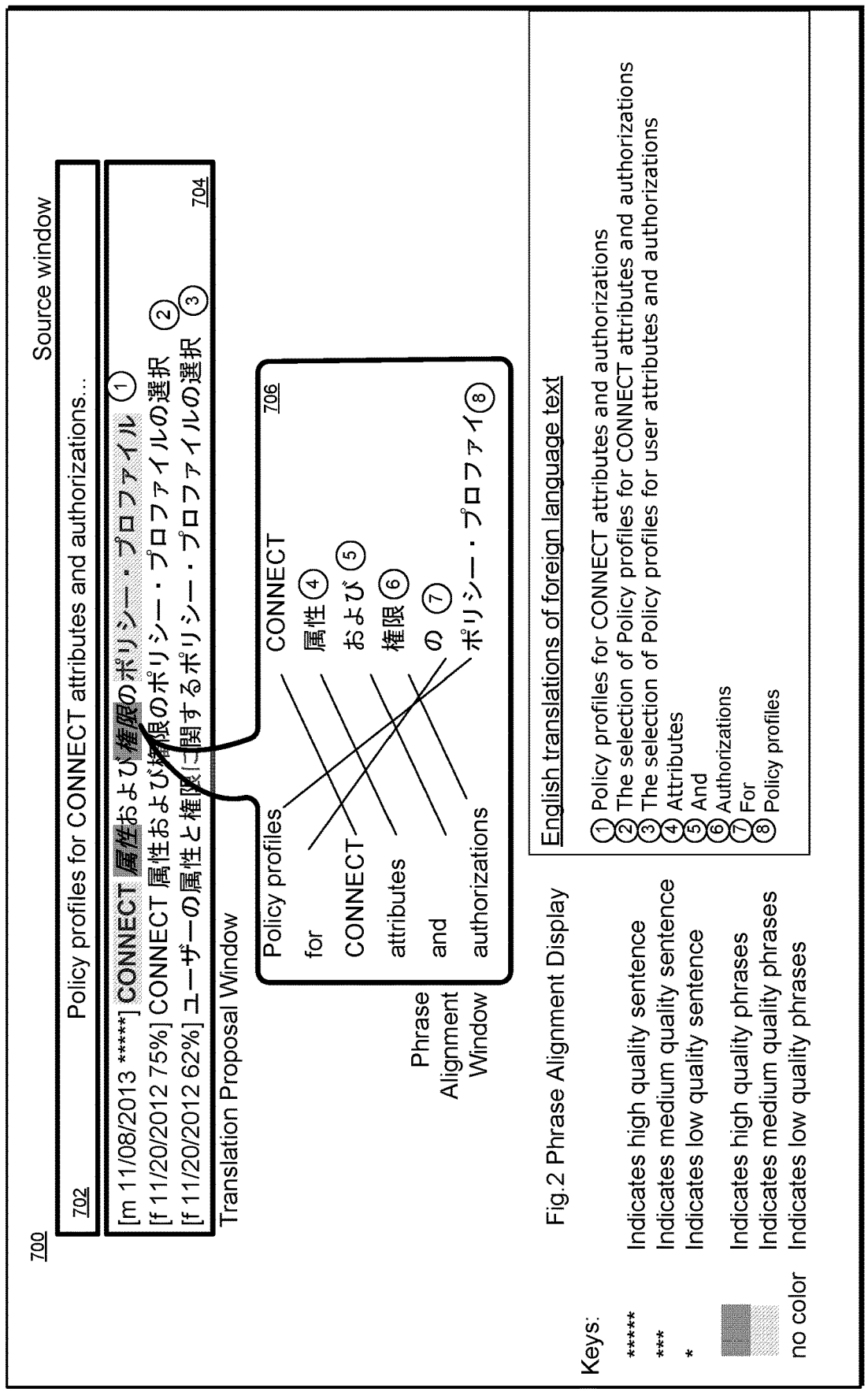
FIG. 7 depicts another example of a graphical user interface (GUI) in accordance with an illustrative embodiment.

With reference to FIG. 7, this figure depicts another example of a graphical user interface (GUI) 700 in accordance with an illustrative embodiment. GUI 700 includes a source window 702, a translation proposal window 704, and a phrase alignment window 706. Source window 702 includes a source text in a first language that is desired to be translated into a second language. In the example illustrated in FIG. 7, a source text in the English language is desired to be translated to the Japanese language.

In the embodiment of FIG. 7, when a user uses GUI 600 to place a mouse cursor on a particular phrase within translation proposal window 604 and click on the phrase, GUI 700 displays phrase alignment window 706 in a pop-up window. Phrase alignment window 706 displays a phrase level alignment between phrases in the source text and machine translation output. Phrase alignment window 706 allows a user to observe the relationship of the source and target phrases, as well as allow the user to move particular phrases to address word order translation errors. In the particular example of FIG. 7, phrase alignment window 706 displays a line connecting each phrase in the source text to a corresponding phrase in the machine translation output.

Figure 8:
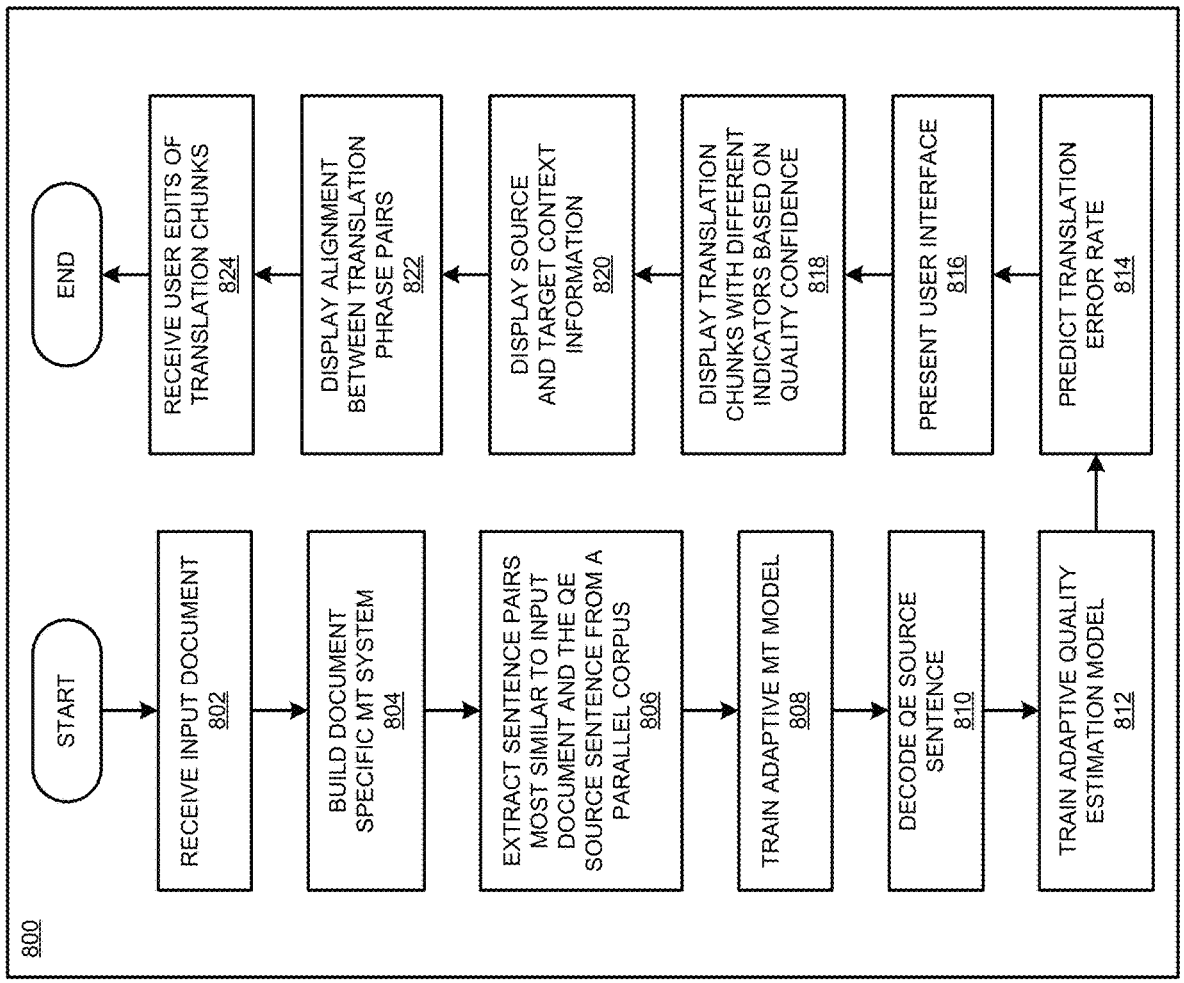
FIG. 8 depicts a flowchart of an example process for providing adaptive quality estimation for machine translation during post-editing of a translated document in accordance with an illustrative embodiment.

With reference to FIG. 8, this figure depicts a flowchart of an example process 800 for providing adaptive quality estimation for machine translation during post-editing of a translated document in accordance with an illustrative embodiment. In 802, MT application 105 receives an input document including source text in a first language that is desired to be translated to a second language. In 804, MT application 105 builds or constructs a machine translation (MT) system corresponding to the input document. In one or more embodiments, MT application 105 further translates the input document to the second language to produce an MT target output including translated text in the second language. In block 806, MT application 105 extracts sentence pairs most similar to the input document and the QE source sentence from a parallel corpus. In block 808, MT application 105 trains the adaptive MT model. In block 810, MT application 105 decodes a QE source sentence. In block 812, MT application 105 trains an adaptive quality estimation model using the extracted sentence pairs and the QE source sentence. In block 814, the MT system predicts a translation error rate (TER) as a translation quality confidence estimate for each sentence of the target output text and each translation chunk using the adaptive quality estimation model. In or more embodiments, a translation chunk includes a word and/or phrase of the target output text. In one or more embodiments, MT application 105 sends the source text, target output text, and translation quality estimate for each sentence and phrase to client device 110.

In block 816, client device 110 presents a GUI to display the quality estimation results to a user in conjunction with the translated target output text. In an embodiment, the GUI displays both sentence level translation quality confidence estimation and translation chunk (e.g., a phrase level) translation confidence estimation. In an embodiment, on a sentence level the predicted translation error rate (PIER) of a sentence is represented in the GUI by a multi-scale translation confidence indicator. In one or more embodiments, client device 110 displays a first translation confidence indicator for one or more sentences in which the first translation confidence indicator is determined from among a plurality of different first translation confidence indicators based upon the first translation quality confidence estimate.

In block 818, client device 110 displays one or more of the translation chunks within the GUI with different visual indicators based upon the translation quality confidence estimate. In a particular embodiment, the GUI displays translation chunks, such as words or phrases, in a translation output window with different translation quality confidence indicators using different fonts and/or colors based upon the translation quality confidence estimate of the particular translation chunk. In one or more embodiments, client device 110 displays a second translation confidence indicator for one or more translation chunks in which the second translation confidence indicator is determined from among a plurality of different second translation confidence indicators based upon the second translation quality confidence estimate.

In block 820, client device 110 displays one or more of source context information and target context information for one or more of the translation chunks. In an embodiment, the source context information indicates a context of the phrase within the source text, and the target context information of the information within the translated text of the translated output. In one or more embodiments, the GUI includes a phrase context window that includes an indication of a location within the source text where the phrase is found as well as one or more words or phrases occurring before and/or after the phrase within the source text. In one or more embodiments, the context window also includes an indication of a location within a target language training corpus that was used to derive the translated phrase. In one or more embodiments, the displaying of the context information is responsive to a first user input such as placing a mouse pointer upon a particular translation chunk. In a particular embodiment, when a mouse cursor is placed on a translation chunk (e.g., phrase) of the translated text, context information of the phrase, such as the where the phrase is extracted from the training corpus, is displayed in a pop-up window within the GUI.

In block 822, client device 110 displays an alignment between translation chunks (e.g., phrase pairs) between the source text and the translated text within the GUI. In one or more embodiments, the displaying of the alignment information is responsive to a second user input such as clicking a mouse pointer upon a particular translation chunk. In a particular embodiment, when a mouse cursor is clicked on the translated phrase, phrase level alignment between the source sentence and MT output is displayed in a pop-up window of the GUI, which allows the user to observe the relationship of the source and target phrases. In block 824, client device 110 receives one or more user edits of the translation chunks to move a particular translation chunk within the translation output such as to address word order translation errors if necessary. The procedure 800 then ends.

Thus, a computer implemented method, system or apparatus, and computer program product are provided in the illustrative embodiments for providing adaptive quality estimation for machine translation during post-editing of a translated document and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
 receiving a translation text output, the translation text output corresponding to a machine translation from a document comprising source text of a first language to a target text of a second language, the translation text output including at least one sentence, the at least one sentence including at least one translation chunk, wherein the machine translation employs an adaptive quality estimation model, and wherein a document-specific machine translation system is built for each document;

receiving a first translation quality confidence estimate for the at least one sentence of text;

receiving a second translation quality confidence estimate for the at least one translation chunk;

displaying a first translation confidence indicator for the at least one sentence, the first translation confidence indicator determined from among a plurality of different first translation confidence indicators based upon the first translation quality confidence estimate;

displaying a second translation confidence indicator for the at least one translation chunk, the second translation confidence indicator determined from among a plurality of different second translation confidence indicators based upon the second translation quality confidence estimate; and training the adaptive quality estimation model using at least the source text, the target text, and the first translation quality confidence estimate.

2. The method of claim 1, further comprising:
displaying a context information of the translation chunk indicating a context of the translation chunk within the source text.

3. The method of claim 2, wherein the context information includes a location within the source text where the translation chunk is found.

4. The method of claim 3, wherein the context information further includes one or more other translation chunks within the source text adjacent to the translation chunk.

5. The method of claim 2, wherein the context information further includes an indication of a location within a target language training corpus that was used to derive the translation chunk.

6. The method of claim 2, wherein the displaying of the context information of the translation chunk is responsive to a first user input.

7. The method of claim 6, wherein the first user input includes placing a mouse cursor upon the translation chunk.

8. The method of claim 1, further comprising:
displaying an alignment between corresponding translation chunks in the source text and the translation text output.

9. The method of claim 8, wherein the displaying of the alignment is responsive to a second user input.

10. The method of claim 9, wherein the second user input includes clicking a mouse pointer upon the translation chunk.

11. The method of claim 1, further comprising:
receiving a user input indicating a moving of the translation chunk in the translation text output.

12. The method of claim 1, wherein the translation chunk includes a phrase.

13. The method of claim 1, wherein each of the plurality of different second translation confidence indicators includes a different color.

14. The method of claim 1, wherein each of the plurality of different second translation confidence indicators includes a different font.

15. A computer usable program product comprising one or more computer-readable storage devices, and program instructions stored on at least one of the one or more storage devices, the stored program instructions comprising:

program instructions to receive a translation text output, the translation text output corresponding to a machine translation from a document comprising source text of a first language to a target text of a second language, the translation text output including at least one sentence, the at least one sentence including at least one translation chunk, wherein the machine translation employs an adaptive quality estimation model, and wherein a document-specific machine translation system is built for each document;

program instructions to receive a first translation quality confidence estimate for the at least one sentence of text;

program instructions to receive a second translation quality confidence estimate for the at least one translation chunk;

program instructions to display a first translation confidence indicator for the at least one sentence, the first translation confidence indicator determined from among a plurality of different first translation confidence indicators based upon the first translation quality confidence estimate; and program instructions to display a second translation confidence indicator for the at least one translation chunk, the second translation confidence indicator determined from among a plurality of different second translation confidence indicators based upon the second translation quality confidence estimate; and program instructions to train the adaptive quality estimation model using at least the source text, the target text, and the first translation quality confidence estimate.

16. The computer usable program product of claim 15, further comprising:
program instructions to display a context information of the translation chunk indicating a context of the translation chunk within the source text.

17. The computer usable program product of claim 16, wherein the context information includes a location within the source text where the translation chunk is found.

18. The computer usable program product of claim 15, wherein the computer usable code is stored in a computer readable storage device in a data processing system, and wherein the computer usable code is transferred over a network from a remote data processing system.

19. The computer usable program product of claim 15, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive a translation text output, the translation text output corresponding to a machine translation from a document comprising source text of a first language to a target text of a second language, the translation text output including at least one sentence, the at least one sentence including at least one translation chunk, wherein the machine translation employs an adaptive quality estimation model, and wherein a document-specific machine translation system is built for each document;

program instructions to receive a first translation quality confidence estimate for the at least one sentence of text;

program instructions to receive a second translation quality confidence estimate for the at least one translation chunk;

program instructions to display a first translation confidence indicator for the at least one sentence, the first translation confidence indicator determined from among a plurality of different first translation confidence indicators based upon the first translation quality confidence estimate; and program instructions to display a second translation confidence indicator for the at least one translation chunk, the second translation confidence indicator determined from among a plurality of different second translation confidence indicators based upon the second translation quality confidence estimate; and program instructions to train the adaptive quality estimation model using at least the source text, the target text, and the first translation quality confidence estimate.

* * * * *